[12] United States Patent  
Fong

(10) Patent No.: US 6,782,303 B1  
(45) Date of Patent: Aug. 24, 2004

(54) CALIBRATING DEPOSITION RATES IN SELECTIVE DEPOSITION MODELING

(75) Inventor: Jon Jody Fong, Calabasas, CA (US)

(73) Assignee: 3D Systems, Inc., Valencia, CA (US)

( * ) Notice: Subject to any disclaimer, the term of this patent is extended or adjusted under 35 U.S.C. 154(b) by 0 days.

(21) Appl. No.: 09/999,223

(22) Filed: Nov. 30, 2001

(51) Int. Cl.⁷ .............................................. G06F 19/00
(52) U.S. Cl. ..................................... 700/119; 700/118
(58) Field of Search ............................... 700/118, 119, 700/120; 425/215, 375

(56) References Cited

U.S. PATENT DOCUMENTS

| | | | |
|---|---|---|---|
| 5,017,753 A | 5/1991 | Deckard | 264/497 |
| 5,136,515 A | 8/1992 | Helinski | 700/119 |
| 5,236,637 A | 8/1993 | Hull | 264/401 |
| 5,303,141 A | 4/1994 | Batchelder et al. | 700/29 |
| 5,555,176 A | 9/1996 | Menhennett et al. | 700/118 |
| 5,572,431 A | 11/1996 | Brown et al. | 700/95 |
| 5,859,775 A | 1/1999 | Barlage, III et al. | 700/108 |
| 5,943,235 A | 8/1999 | Earl et al. | 700/98 |
| 5,969,971 A * | 10/1999 | Brown et al. | 700/119 |
| 6,110,409 A | 8/2000 | Allanic et al. | 264/401 |
| 6,347,257 B1 * | 2/2002 | Bedal et al. | 700/119 |
| 6,546,306 B1 * | 4/2003 | Bushman et al. | 700/121 |

OTHER PUBLICATIONS

U.S. patent application No. 09/779,355, filed Feb. 8, 2001, by Kerekes.

U.S. patent application No. 09/970,956, filed Oct. 3, 2001, by Varnon et al.

U.S. patent application No. 09/971,247, filed Oct. 3, 2001, by Schmidt et al.

U.S. patent application No. 09/971,337, filed Oct. 3, 2001, by Schmidt.

* cited by examiner

Primary Examiner—Albert W. Paladini  
Assistant Examiner—Ryan Jarrett  
(74) Attorney, Agent, or Firm—Ralph D'Alessandro; James E. Curry

(57) ABSTRACT

A selective deposition modeling apparatus utilizing a planarizer to dimensionally normalize the layers of a three-dimensional object as it is being built. The apparatus includes a means for measuring the power used to dimensionally normalize the layers which is indicative of the amount of excess build material that has been dispensed. The apparatus then utilizes the measurement to alter the excess amount of build material of a next dispensed layer so as to optimize the build rate and reduce the production of waste material. In one embodiment the planarizer is rotated at a constant angular velocity by a motor and the current supplied to the motor is monitored, and a print head supplied with a firing voltage is used to dispense the build material. The voltage supplied to the print head is adjusted to optimize the build rate of the apparatus.

20 Claims, 5 Drawing Sheets

CALIBRATING DEPOSITION RATES IN SELECTIVE DEPOSITION MODELING

BACKGROUND OF THE INVENTION

1. Field of the Invention

The invention relates in general to solid freeform fabrication and, in particular, to a feedback system for determining the deposition rate of a selective deposition modeling apparatus so as to optimize the deposition rate to increase build speed and reduce the generation of waste.

2. Description of the Prior Art

In selective deposition modeling, herein referred to as "SDM," complex parts are produced from a modeling material in an additive fashion as opposed to traditional fabrication techniques, which are generally subtractive in nature. For example, in traditional fabrication techniques material is removed by machining operations or shaped in a die or mold to near net shape and then trimmed. In contrast, additive fabrication techniques such as SDM incrementally add portions of a build material to targeted locations, layer by layer, in order to build a complex part.

In SDM, a solid modeling material is physically deposited in successive fashion to form an object. In one type of SDM technology the solid modeling material is extruded as a continuous filament through a resistively heated nozzle. In yet another type of SDM technology, the solid modeling material is jetted or dropped in discrete droplets in order to build up a part. Often, a thermoplastic material having a low-melting point is used as the solid modeling material, which is delivered through a jetting system such as those used in ink-jet printers. One type of SDM process utilizing ink-jet print heads is described, for example, in U.S. Pat. No. 5,555,176 to Menhennett, et al. Another type of SDM process which extrudes a bead of material to build a part is described in, for example, U.S. Pat. No. 5,303,141 to Batchelder et al. Still other SDM processes dispense two different solidifiable materials, such as the SDM process described in U.S. Pat. No. 5,136,515 to Helinski. In addition, other SDM processes dispense sintered powders, pastes, and liquids, as described respectively in U.S. Pat. No. 5,017,753 to Deckard, U.S. Pat. No. 6,110,409 to Allanic et al., and U.S. Pat. No. 5,236,637 to Hull.

Although SDM methods have many advantages compared to conventional fabrication methods, they also have unique problems that are rooted in the layer by layer building process. One common problem in the layer by layer building process results from the dimensional variability inherent in the building of each layer. These dimensional inaccuracies result from numerous phenomena, such as the accumulated effects of drop volume variation, thermal distortion, errors in deposition, and the like. In addition, the type of geometrical configurations being formed can also influence these inaccuracies, such as the production of web or branching supports. Also, a weakened or blocked dispensing jet will contribute to these inaccuracies. If unchecked, these tolerances can accumulate throughout the part as it is built up in height layer by layer. As the thickness of layers is reduced in order to achieve greater surface resolution, the accumulated effects of these undesirable tolerances can substantially distort the resultant part. Thus, most SDM processes require some method to dimensionally normalize or smooth the top working surface of the part while it is being built.

Generally, most dimensional normalization methods physically adjust the vertical height of the part by smoothing or leveling the build material deposited in the layers. This commonly produces waste material. Such systems are open loop systems that provide no active feedback to compensate the build rate of the layer. For example, in one open loop approach, each layer of build material is dispensed at a thickness that is to greater than a desired thickness of the layer, and then a normalizing device is activated to remove the excess build material to achieve the desired thickness. Although distortions between the layers are eliminated, waste material is generated.

An example of the excess build material approach is found in U.S. Pat. No. 5,943,235 to Earl et al., wherein a pre-heated rotating planarizer is provided to normalize each layer. Under this approach, after a layer of build material has been deposited by the SDM apparatus in excess of the desired thickness, the pre-heated cylindrical roller (planarizer) is passed over the deposited material to establish the desired thickness. The rolling planarizer locally melts a portion of the build material of the layer. Some of the material adheres to the surface of the planarizer as it rolls, and a wiping or scraping device such as a blade peels or skives off the excess build material from the planarizer. The excess build material is accumulated by the planarizer as waste material.

Other dimensional normalizing systems that generate waste material are found in U.S. Pat. No. 5,859,775 to Barlage, III et al. and U.S. Pat. No. 5,572,431 to Brown et al. Under these approaches, a heated body is selectively driven across the dispensed build material in response to a sensed deviation in order to melt and displace the build material. The excess material is then sucked off by a vacuum source connected to the heated body. Thus, waste material is commonly generated during most dimensional normalization processes used in SDM.

In all SDM systems it is desirable to reduce the time required to build an object. However, dispensing material in an amount in excess of that needed undesirably increases build time. For example, if build material is dispensed in excess of the Id desired layer thickness by about 35%, then about 35% of the time spent dispensing material does not contribute to forming the resultant part. Further, 35% of the material will be waste at the end of the build process. Thus, it would be desirable to reduce the amount of excess material that is dispensed in order to increase build speed and decrease waste.

However, many dispensing devices such as ink jet print heads tend to degrade over time due to thermal degradation. This thermal degradation often results in a reduction in the quantity of material being dispensed, often referred to as drop volume. Over time this degradation can be significant, particularly for print heads that are supplied with a constant firing voltage. For example, if a print head were initially set to dispense in excess of 35% when new, it may only dispense in excess of 5% at a later time after thermal degradation has set in. Thus, a substantial reduction in build time and generation of waste material can be realized by optimizing the deposition rate of the print head as thermal degradation sets in. However, developing such a system to optimize the deposition rate has proven problematic.

Active surface imaging systems have been proposed to normalize the surface of each layer. Such systems actively monitor the surface condition of any given layer by collecting image data that is processed to provide feedback data that can be used to selectively dispense additional material in low areas to form a uniform layer. One such system is disclosed in U.S. Ser. No. 09/779,355 to Kerekes, filed on Feb. 8, 2001. Although such an active closed loop imaging system can eliminate the use of a planarizer, it may introduce additional complexities to the apparatus that may impact reliability and cost. If a planarizer system can be optimized in conjunction with adjusting to the deposition rate of the print head, there may be no need to introduce a complex active surface scanning system in an SDM apparatus.

Thus, there is a need to provide an SDM process capable of dimensionally normalizing layers of a three-dimensional object by generating a minimal amount of waste material. There is also a need to decrease build time by reducing the amount of time spent depositing excess build material for each layer. These and other difficulties of the prior art have been overcome according to the present invention.

BRIEF SUMMARY OF THE INVENTION

The present invention provides its benefits across a broad spectrum of three-dimensional building processes. While the description which follows hereinafter is meant to be representative of a number of such applications, it is not exhaustive. As will be understood, the basic apparatus and methods taught herein can be readily adapted to many uses. It is intended that this specification and the claims appended hereto be accorded a breadth in keeping with the scope and spirit of the invention being disclosed despite what might appear to be limiting language imposed by the requirements of referring to the specific examples disclosed.

It is one aspect of the present invention to form a three-dimensional object with an SDM apparatus at the highest build speeds possible.

It is another aspect of the present invention to dimensionally normalize the layers of a three-dimensional object by an SDM apparatus by generating a minimal amount of waste material.

It is still yet another aspect of the present invention to utilize feedback data indicative of the amount of excess build material being deposited in each layer when forming a three-dimensional object to optimally adjust the deposition rate of an SDM apparatus.

It is a feature of the present invention to determine the amount of excess build material being deposited by measuring the amount of power that is utilized when normalizing the layers.

It is an advantage of the present invention that build time can be optimized when using a planarizer to normalize the layers of an object formed by an SDM apparatus.

It is another advantage of the present invention that the build speed of the SDM apparatus can be optimized throughout the life span of the dispensing head.

It is yet another advantage of the present invention that a closed loop system can actively adjust the deposition rate of an SDM apparatus in response to feedback data obtained from measuring the power used in dimensionally normalizing a layer.

These and other aspects, features, and advantages are achieved/attained in the method and apparatus of the present invention that employs a sensor mounted on the planarizer that provides feedback data indicative of the height of the layer of material being normalized. The feedback data is then utilized to adjust the overall firing voltage supplied to the print head to either increase or decrease the deposition rate, as needed. Alternatively, the desired layer thickness can be increased or decreased in response to the feedback data, if desired.

BRIEF DESCRIPTION OF THE DRAWINGS

The aspects, features, and advantages of the present invention will become apparent upon consideration of the following detailed disclosure of the invention, especially when it is taken in conjunction with the accompanying drawings wherein.

To facilitate understanding, identical reference numerals have been used, where possible, to designate identical elements that are common in the figures.

DETAILED DESCRIPTION OF THE PREFERRED EMBODIMENTS

While the present invention is applicable to all SDM techniques and objects made therefrom, the invention will be described with respect to an SDM technique utilizing an ink jet print head dispensing a UV curable phase change material in a flowable state that solidifies soon after being dispensed. The solidified material is dimensionally normalized and then cured by ultraviolet radiation. Alternatively, the curable phase change material may be cured by exposure to radiation having wavelengths other than in the ultraviolet band of the spectrum, or by subjecting the material to thermal heat. However, it is to be appreciated that the present invention can be implemented with any SDM technique dispensing any number of a wide variety of curable or non-curable build materials. The materials, for example, may comprise a variety of forms such as a powder, liquid, paste, foam, or gel.

As used herein, the term "a flowable state" of a build material is a state wherein the material is unable to resist the shear stresses that are induced by a dispensing device, such as those induced by an ink jet print head when dispensing the material. Preferably the flowable state of the build material is a liquid state, however, the flowable state of the build material may also exhibit thixotropic-like properties. The term "solidified" and "solidifiable" as used herein refer to the phase change characteristics of a material where the material transitions from the flowable state to a non-flowable state. A "non-flowable state" of a build material is a state wherein the material is sufficiently self-supportive under its own weight so as to hold its own shape. A build material existing in a solid state, a gel state, a paste state, or a thixotropic state, are examples of a non-flowable state of a build material for the purposes herein. In addition, the term "cured" or "curable" refers to any thermoset reaction triggered in the material by exposure to radiation or thermal heat. Preferably the thermoset reaction involves the cross-linking of polymers initiated by exposure to ultraviolet radiation. Further, the term "cured state" refers to a material, or portion of a material, in which the thermoset reaction has substantially completed. It is to be appreciated that as a general matter the material can easily transition between the flowable and non-flowable state prior to being cured; however, once cured, the material cannot transition back to a flowable state.

Figure 1:
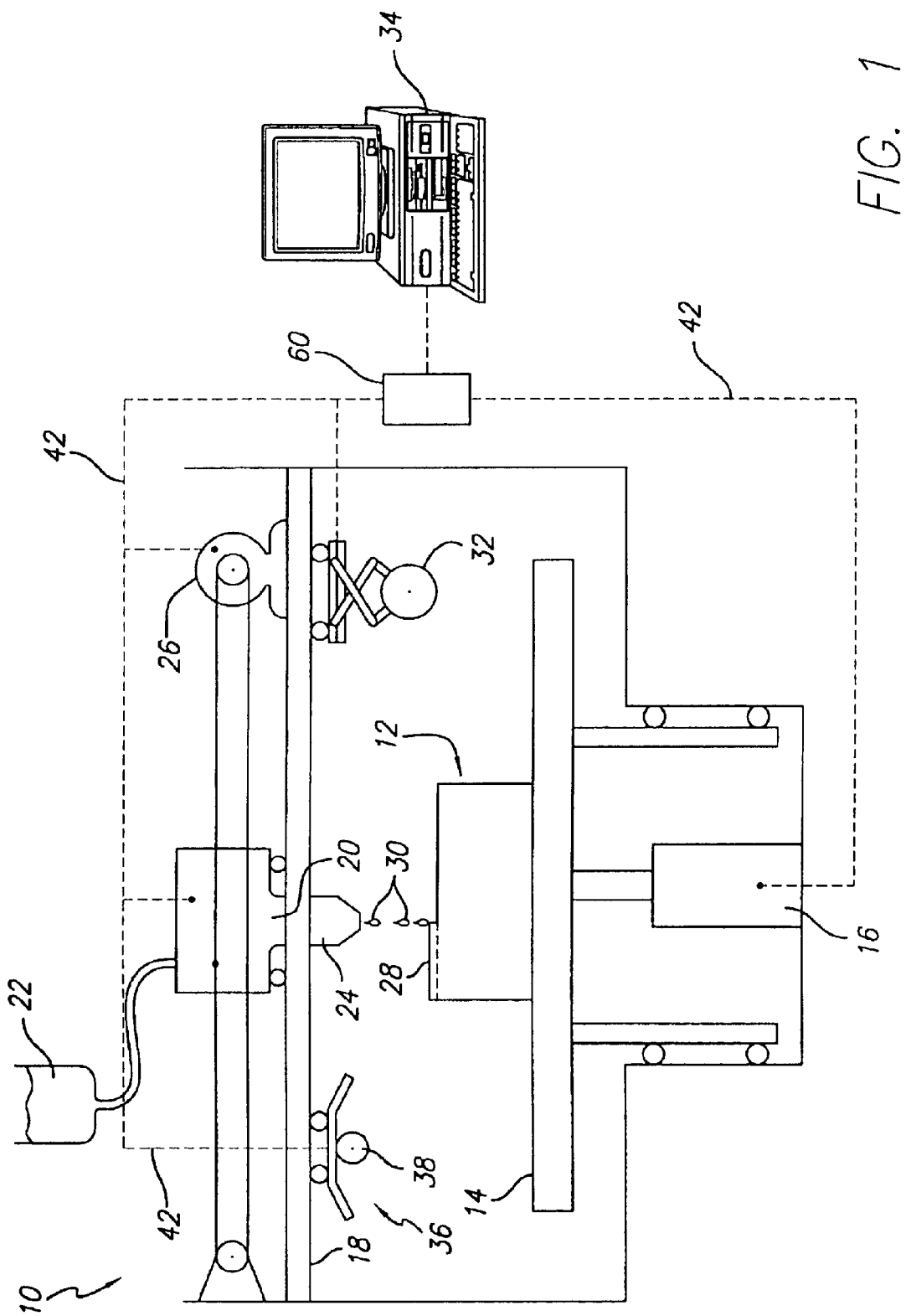
FIG. 1 is a schematic side view of an SDM apparatus for practicing the present invention.

Referring particularly to FIG. 1 there is illustrated generally by the numeral 10 an SDM apparatus for practicing the present invention SDM process. The SDM apparatus 10 is shown building a three-dimensional object, shown generally by the numeral 12. The object 12 is built in a layerwise manner and resides on a build platform 14 that can be precisely positioned vertically by any conventional actuation means 16. Directly above and parallel to the platform 14 is a rail system 18 on which a material dispensing trolley 20 resides. The dispensing trolley is fed a curable phase change material from a material reservoir 22 that heats the material above the flowable temperature of the material, commonly referred to as the melting point. Located on the dispensing trolley is at least one dispensing device 24 for dispensing the curable phase change material. Preferably, the dispensing device 24 is an ink jet print head of the piezoelectric type having a plurality of dispensing orifices, however, other print head types could be used, such as an acoustic or electrostatic type. A preferred ink jet print head is the Z850 print head available from Xerox Corporation of Wilsonville, Ore. Alternatively, a thermal spray nozzle could be used, if desired.

The trolley is reciprocally driven along a horizontal path by a conventional drive means 26. Generally, it takes multiple passes of the trolley 20 to dispense one complete layer of curable phase change material from the ink jet print head 24 onto respective target locations for a given layer. Although the dispensing trolley 20 is shown being reciprocally driven, the platform 14 could instead by reciprocally driven, if desired. Preferably, material is dispensed in an amount exceeding the amount needed to form the layer at a desired layer thickness. The dispensed layer is then normalized by the planarizer 32 which smoothes the layer and removes the excess material. In FIG. 1, a portion of a layer of dispensed phase change material 28 is shown as the trolley has just started its pass from left to right. Dispensed droplets 30 are shown in mid-flight on their way to impact target locations on the object 12. The distance between the dispensing orifices of the print head 24 and the layer 28 of discrete droplets of material is greatly exaggerated for ease of illustration.

The phase change material is dispensed as discrete droplets 30 in the flowable state, which solidify upon contact with the layer 28. Alternatively, the basic method taught herein may also be adapted for use in SDM systems that dispense a continuous stream of a phase change material, if desired. When depositing discrete droplets, each layer of the object is divided into a plurality of pixels, in which case a target location may be assigned to a given pixel location. Generally, when the volume of the droplets are of a sufficient size that, once deposited, they effectively cover the area of a pixel that has been targeted, the dispensing of the droplets on the target locations results in a solid fill condition. The solid fill condition for each layer contains material in excess of that needed to form the layer at a desired layer thickness.

Preferably, a remote computer 34 takes a CAD data file and generates three-dimensional coordinate data of an object, commonly referred to as an STL file. When a user desires to build an object, a print command is executed at the remote computer in which the STL file is processed through print client software that is sent to the SDM apparatus 10 as a print job. The print job is processed and transmitted to the SDM apparatus by any conventional data transferable medium desired, such as by magnetic disk tape, microelectronic memory, or the like. The data transmission route and controls of the SDM apparatus are represented as dashed lines at 42. The data is processed into a data descriptive of the layers of the three-dimensional object to be built. A computer controller 60 utilizes the data descriptive of the layers to produce the appropriate control commands to operate the apparatus 10 to form the three-dimensional object.

In FIG. 1, a planarizer 32 is used to successively shape the layers as needed. Such shaping is needed in order to eliminate the accumulated effects of drop volume variation, thermal distortion, and the like, which occur during the build process. Planarizers are also used, for example, in laser sintering systems such as the counter rotating drum planarizer disclosed in U.S. Pat. No. 5,017,753 to Deckard. The planarizer 32 is preferably mounted to the material dispensing trolley 20 such that it is allowed to project from the underside of the platform by a sufficient amount in the Z-direction so that it contacts the layer of dispensed material 28 at a desired level. However, the planarizer 32 may be mounted on its own trolley as shown in FIG. 1. Specifically, it is the function of the planarizer to melt, transfer, and remove portions of the previously dispensed layer of build material in order to smooth it out and set a desired thickness for the last formed layer. This is referred to as "normalizing" a layer. As used herein, the term "dimensionally normalizing" or "normalizing" refers to the process of equalizing at least a portion of a layer of build material so that the portion of the layer achieves a desired thickness, flatness, and/or shape. The planarizer 32 removes the excess build material from each layer to achieve the desired thickness for the layer.

The planarizer 32 is heated by a heating element (not shown) that is preferably located on the axis of rotation of the planarizer. The heat transferred to the surface of the planarizer from the heating element locally raises the temperature of the build go material above its flowable temperature, thereby causing the material to transition to its molten state. Numeral 28 identifies a layer of build material that has just been deposited by the print head. The rotation of the planarizer or cylinder 32 sweeps molten material from the just-deposited layer 28, leaving in its path a smooth surface of build material. Some of the molten material adheres to the planarizer 32, which is scraped off and disposed of as waste material. A waste collection system (not shown) is used to collect the excess material for removal that is generated during planarizing. The waste collection system may comprise an umbilical that delivers the material to a waste tank or waste cartridge, if desired. Preferably, the material is curable upon exposure to radiation, and an exposure system may be used to cure the waste material prior to removing the waste material from the system so as to make the material effectively non-toxic. For example, the SDM apparatus 10 shown in FIG. 1 includes a flood ultraviolet light source 38 mounted on its own trolley generally identified by numeral 36 for curing a reactive phase change material dispensed from the dispenser 24. This is accomplished after the material has solidified upon contact with the previous layer. The light source 38 could also be used to cure waste material, or a separate light source could be used to cure waste material, if desired. A preferred method for dispensing a curable phase change material to form a three-dimensional object and for dispensing a non-curable phase change material to form supports for the object is disclosed in U.S. patent application Ser. No. 09/971,337 filed Oct. 3, 2001 entitled "Selective Deposition Modeling with Curable Phase Change Materials." A preferred curable phase change material and non-curable phase change support material is disclosed in U.S. patent application Ser. No. 09/971,247 filed Oct. 3, 2001 entitled "Ultra-Violet Light Curable Hot Melt Composition." A preferred material feed and waste is disclosed in U.S. patent application Ser. No. 09/970,956, filed Oct. 3, 2001 entitled "Quantized Feed System." All of these related applications are incorporated by reference in their entirety herein.

The planarizer is commonly used in open loop SDM techniques wherein the dimensional variability inherent in the layer-by-layer build process is neither monitored nor compensated for during the build process. Although the dimensional variability in the layers does not need to be monitored, the build rate of the object formed by the apparatus is generally not optimized as can be done with a closed loop system. This problem is overcome according to the present invention without relying on optical scanning devices, or the like, to monitor the surface condition of the layers.

Figure 2:
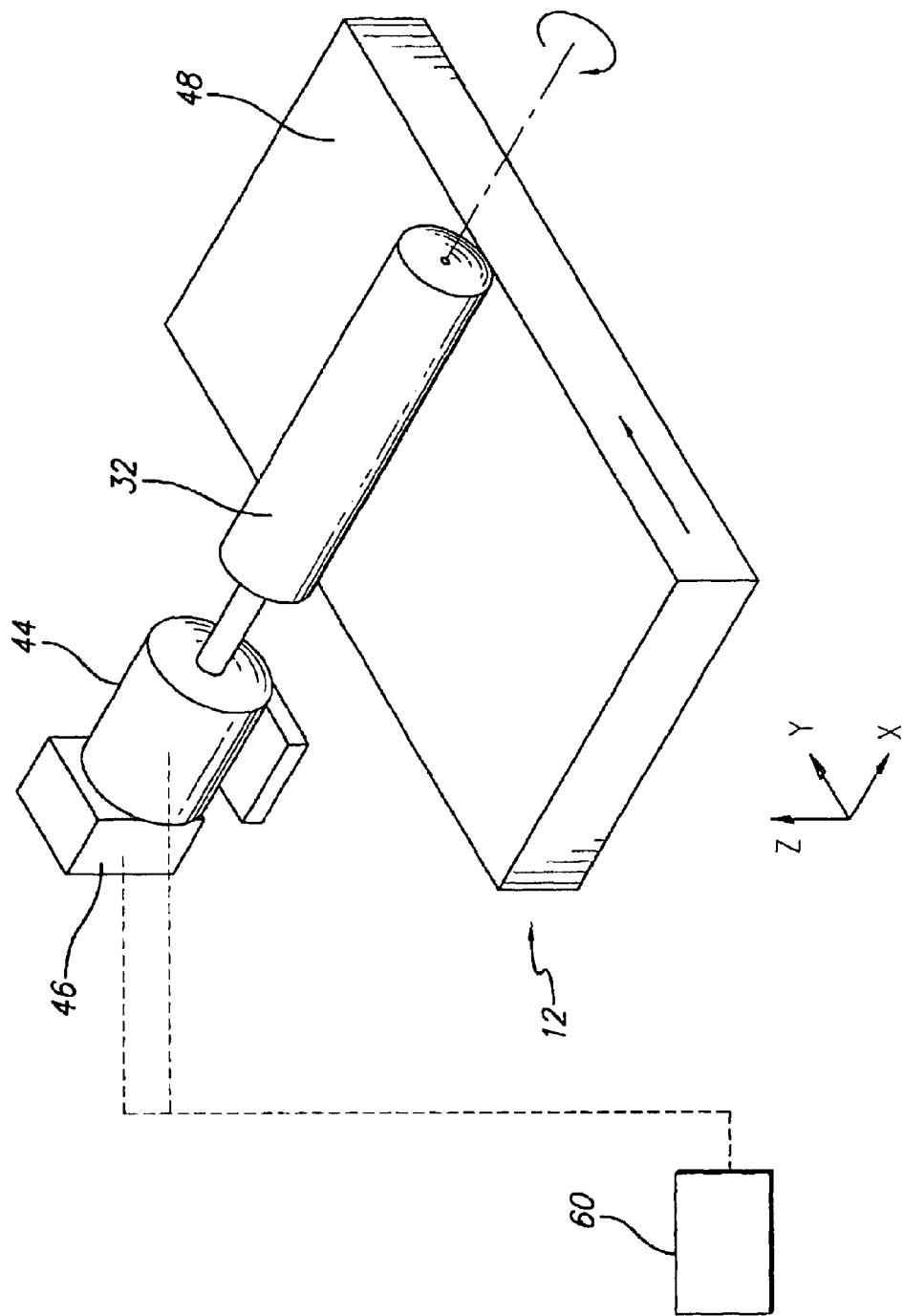
FIG. 2 is a schematic isometric view of one embodiment of the present invention.

Now referring to FIG. 2, a planarizer 32 is shown that is adapted for practicing the present invention. The planarizer 32 is shown dimensionally normalizing a top layer 48 of dispensed material of the object, generally shown by numeral 12. The planarizer 32 is rotably driven at a substantially constant angular velocity when being used to dimensionally normalize a layer of dispensed material. The layers are dimensionally normalized by the planarizer moving at a substantially constant linear velocity across the layer. In the embodiment shown, a motor 44 is used to directly drive the planarizer 32 at a constant angular velocity, although a non-direct drive means could be used, such as a gear or pulley system. A DC shunt motor is appropriate for such application. Attached to the motor is an encoder 46 for monitoring the angular velocity of the planarizer, which produces a signal indicative of the angular velocity of the planarizer. The signal is provided to the computer controller 68. The controller 68 then increases or decreases the supply voltage to the motor, as needed, to maintain a constant angular velocity of the planarizer. The electrical current being utilized by the motor during normalizing is indicative of the power being utilized when dimensionally normalizing the layer, and this current is measured by the system during normalizing. In turn, the power utilized when dimensionally normalizing the layer is indicative of the load on the planarizer, which, when certain conditions are met, is indicative of the amount of excess material being removed when dimensionally normalizing a layer. Thus, under the appropriate conditions, measurements of the current used by the planarizer is indicative of the amount of material being removed when normalizing a layer, which information can be used in a closed loop system to calibrate deposition rates in SDM.

It is believed the load induced on the motor driving the planarizer ($Torque_{remove}$) is proportional to the mass removal rate of the build material times the energy to remove the build material. The energy needed to remove the build material is sensitive to the temperature of the planarizer and the part, which if held generally constant maintains a constant load on the motor driving the planarizer. The load on the planarizer can be expressed as either the torque to remove the material, or as the drag force acting on the planarizer. For purposes of discussion herein, the load on the planarizer can be referred to interchangeably as either a torque or a drag force since the radius of the planarizer is constant. The proportionality is:

$Torque_{remove}$ α (mass removal rate) (energy to remove mass) which proportionality can be further reduced to:

$$Torque_{remove} \alpha (\rho V)(w\ r)(\mu)(T_r)(T_{Part})$$

or $$F_{drag\ force} \alpha (\rho V)(W)(\mu)(T_r)(T_{Part})$$

where ρ is the density of the material, V is the volume of material removed, w is the angular velocity of the planarizer, r is the radius of the planarizer, $\mu$ is the surface finish of the planarizer, $T_r$ is the temperature of the planarizer, and $T_{part}$ is the temperature of the part. It is important that ρ, w r, $\mu$, $T_r$, and $T_{part}$ remain constant so that the torque or drag force will be remain constant for a given mass removal rate. Generally, the temperature of the part $T_{part}$ remains constant during the build process. Although the temperature of the planarizer $T_r$ can fluctuate, it is desirable to maintain the temperature of the planarizer as constant as possible, and preferably within a range of between about 5° C. when planarizing. Thus, changes in the volume of material removed (V) will be directly proportional to the load induced on the planarizer. Assuming the X-dimension and Y-dimension of the material being removed at any layer is the same, then the load induced on the motor is proportional to the thickness of material removed (Z-dimension) during normalizing.

In sum, maintaining the energy to remove mass substantially constant and in a steady state during planarizing is generally accomplished by maintaining the surface temperature of the planarizer substantially constant, and preferably within a range of between about 5° C. Under these conditions, and by knowing the X-Y dimensions of a layer being formed, the measurement of the current of the motor driving the planarizer can be relied upon to be indicative of the amount of material removed during planarizing.

Referring to FIG. 2, a DC shunt motor 44 is shown operated at a constant armature voltage while under a varying field current in conjunction with an encoder 46. The planarizer 32 is shown dimensionally normalizing a top layer 48 of dispensed material of the object, generally shown by numeral 12. The planarizer 32 is driven by the DC shunt motor 44 at constant angular velocity with the assistance of the encoder 46 and computer controller 60 when dimensionally normalizing a layer of dispensed material. The encoder 46 provides feedback data of the angular velocity of the planarizer to the computer controller 60. The computer controller then adjusts the field current to maintain a constant angular velocity of the motor. The computer controller monitoring the current may be a separate dedicated microprocessor in the apparatus, or may be the computer controller that controls the entire apparatus, if desired. One manner in which the computer controller readily adjusts the field current is by altering the resistance of a variable resistor or rheostat in the shunt field circuit of the motor. Hence the measurement of the field current of the motor is indicative of the amount of excess material removed by the planarizer.

Preferably, the change in volume of the material being removed is directly related to changes in the thickness of the layer. This means that the dimensions of the object 12 along the X-axis and Y-axis in FIG. 2 should preferably remain substantially constant when measuring the amount of field current of the shunt motor. Thus it is preferred to execute the method of the present invention when forming a test object of fixed X and Y dimensions. Attentively, the X and Y dimensions can change, as long as the change is known so that an appropriate adjustment can be made to the measured current to account for the change in the X and Y dimensions. Adjusting for a change in the X and Y dimensions can be executed manually or by further processing, if desired, but is not preferred.

Preferably, the test object has a square or rectangular cross-sectional shape in the X and Y directions that remains constant for all layers. Most preferably, the test object is a full envelope part, that is, the largest object size that can be formed in the SDM apparatus. By building a full envelope part the sensitivity of the relationship between changes in current and the thickness of material being removed is minimized and therefore provides for the most optimally accurate field current measurement possible. The present invention may therefore be practiced as a calibration step for any SDM apparatus in order to optimize the performance of the apparatus in light of the decrease in drop mass that occurs during the life of the dispensing device. As the decrease in drop mass over time is substantial with most ink jet print heads, this decrease can be compensated for according to the present invention.

There are also other forces involved that influence torque or drag force to remove the material acting on the planarizer. For instance, the friction force of the skive on the planarizer, the motor back electro-magnetic-force, and coulomb friction drag of the motor, all contribute to the resultant drag force acting on the planarizer when removing material. These forces, however, generally remain constant during the operation of the planarizer and can be ignored when measuring the field current of the shunt motor when planarizing.

According to the present invention a plot or chart can be established from the data acquired from field current measurements of the shunt motor versus various thickness of excess build material being removed by the planarizer. This can be done for each planarizer integrated in an SDM apparatus dispensing a given build material. From the chart, a relationship can be determined which can be utilized by the computer controller so that adjustments can be made to optimally adjust the excess amount of a next disposed layer of material, or to optimally adjust the excess amount of material dispensed by SDM apparatus at specific service intervals by service personnel to compensate for the decrease of drop mass incurred by the print head over time.

Figure 3:
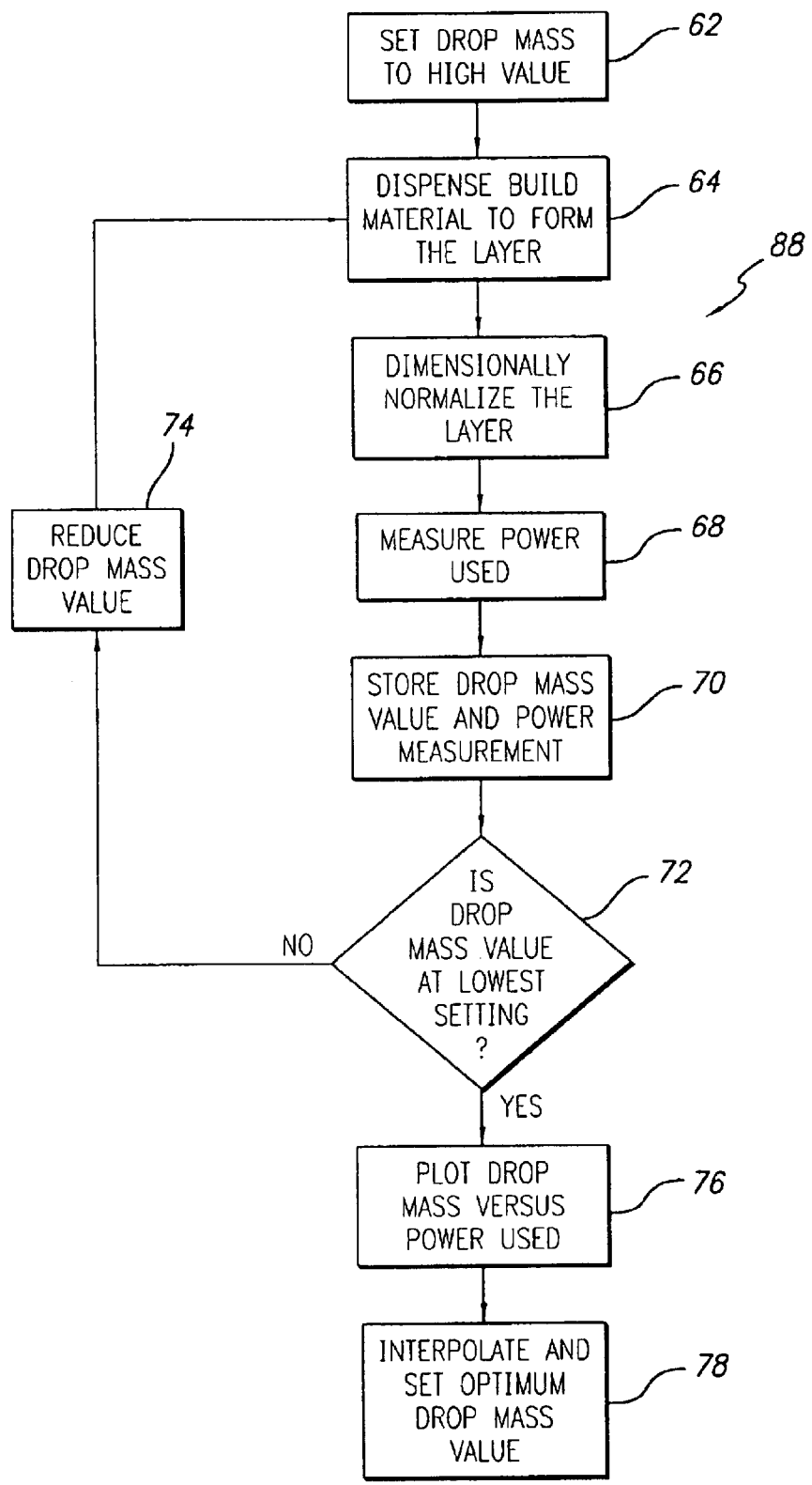
FIG. 3 is a flow chart depicting the method of the present invention.

Referring to FIG. 3, a flow chart shows the steps for practicing the present invention as a calibration step in an SDM apparatus. The calibration method can be executed to optimize the apparatus as the drop mass of the print head degrades over time. The method generally identified by numeral 88 is an iterative process in order to develop a plot of the drop mass values versus the power used to normalize each layer formed. Since drop mass is directly related to the firing voltage supplied to the print head, the different firing voltages of the print head can be used to develop the plot. Initially the drop mass is set at a high value for the apparatus (highest firing voltage), as indicated by numeral 62. For piezoelectric ink jet print heads the drop mass can also be controllably adjusted by changing the dispensing temperature of the print head, however, it is preferred to keep the dispensing temperature constant and adjust the firing voltage to generate plot data. Next, the material is dispensed to form a layer of a test object as identified by numeral 64. Preferably, the test object is a full envelope part. The layer is then normalized by the planarizer as identified by numeral 66, and the power used to normalize the layer is measured, as identified by numeral 68. Preferably, the current used by the planarizer during normalizing is measured as it is indicative of the power used. The drop mass value and power measured are then stored in memory, as identified by numeral 70. The method is repeated in decreasing increments of drop mass, as identified by numeral 72 and 74, until a plurality of data points have been acquired down to the lowest drop mass value setting (lowest firing voltage). Alternatively, the data points could be acquired starting from the lowest drop mass value and moving incrementally upward, if desired. Then, as identified by numeral 76, a plot of the drop mass versus power used can be established for a given SDM apparatus, and by utilizing interpolation techniques an optimum drop mass value can be determined, as identified by numeral 78.

Figure 4:
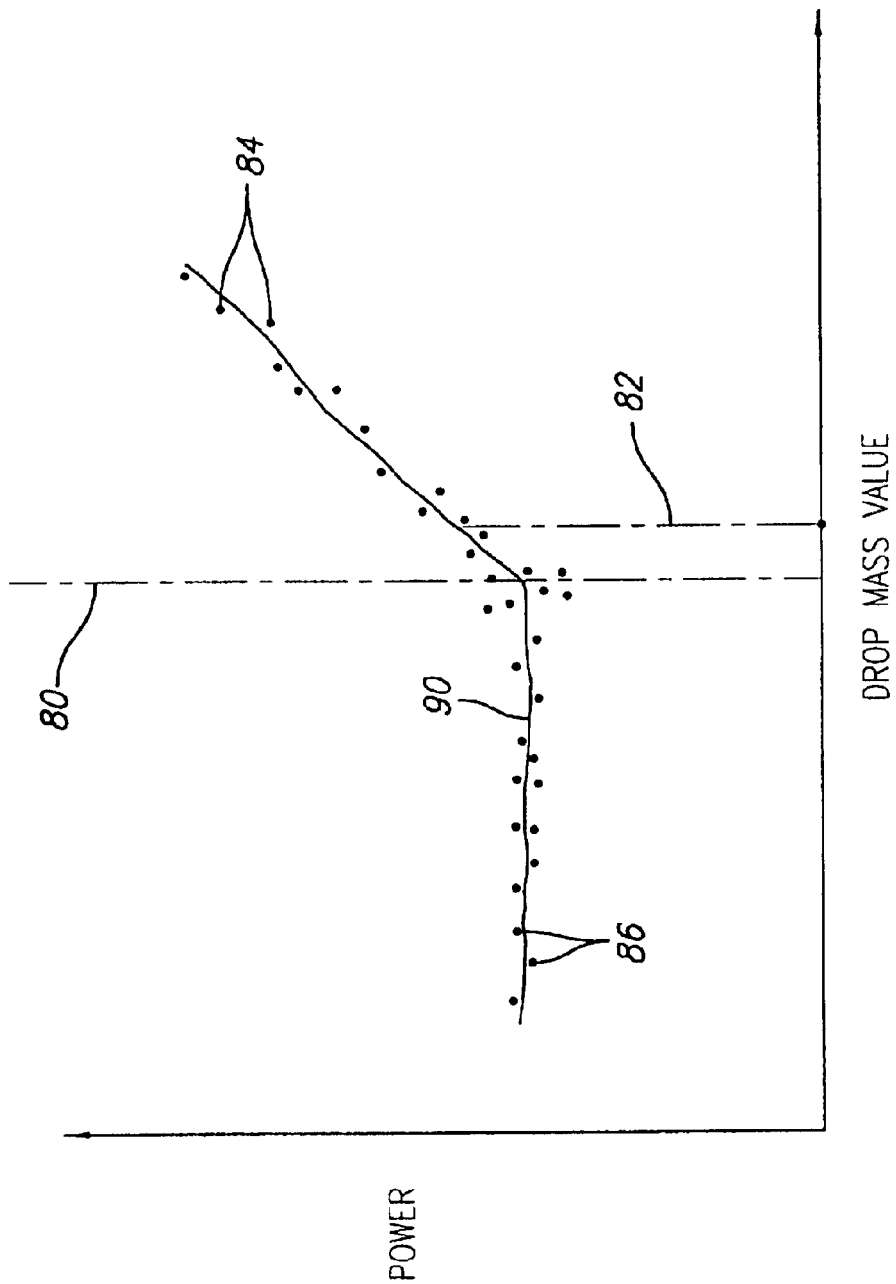
FIG. 4 is a plot of data of drop mass versus power used in the method of the present invention.

It is to be appreciated that the method shown in FIG. 3 can be effectively implemented as a calibration step for servicing SDM systems and optimally adjusting the drop mass of the print heads as they degrade with use. Referring to FIG. 4, a plot of the drop mass versus power is shown which is representative of the plot indicated in step 76 of FIG. 3. The stored data points are plotted as indicated by numerals 84 and 86. Utilizing interpolation techniques graph line 90 can be established. The data points were the graph line 90 is horizontal indicates a drop mass value that is too low. In other words, the drop mass does not dispense enough material in a layer for the planarizer to make contact with the layer. When the drop mass achieves the value indicated by numeral 80, the planarizer has just made contact with the layer. Increasing the drop mass from this point causes more power to be used by the planarizer as the planarizer engages the excess material dispensed in the layer. This results in the ramp portion of line 90 to the right of 80. An optimal drop mass setting would be a value slightly greater than where the planarizer makes contact with the surface of the dispensed layer to assure uniform and complete normalization of the layer such as at the position shown by 82. It is to be appreciated that the plot and adjustment to the optimal drop mass setting may be completed manually or with the assistance of diagnostic equipment that may be connected to the apparatus. However, it is preferred that the plot and adjustment be internally programmed within the computer controller of the apparatus so that calibration of the apparatus can be carried out in a more automated fashion.

Figure 5:
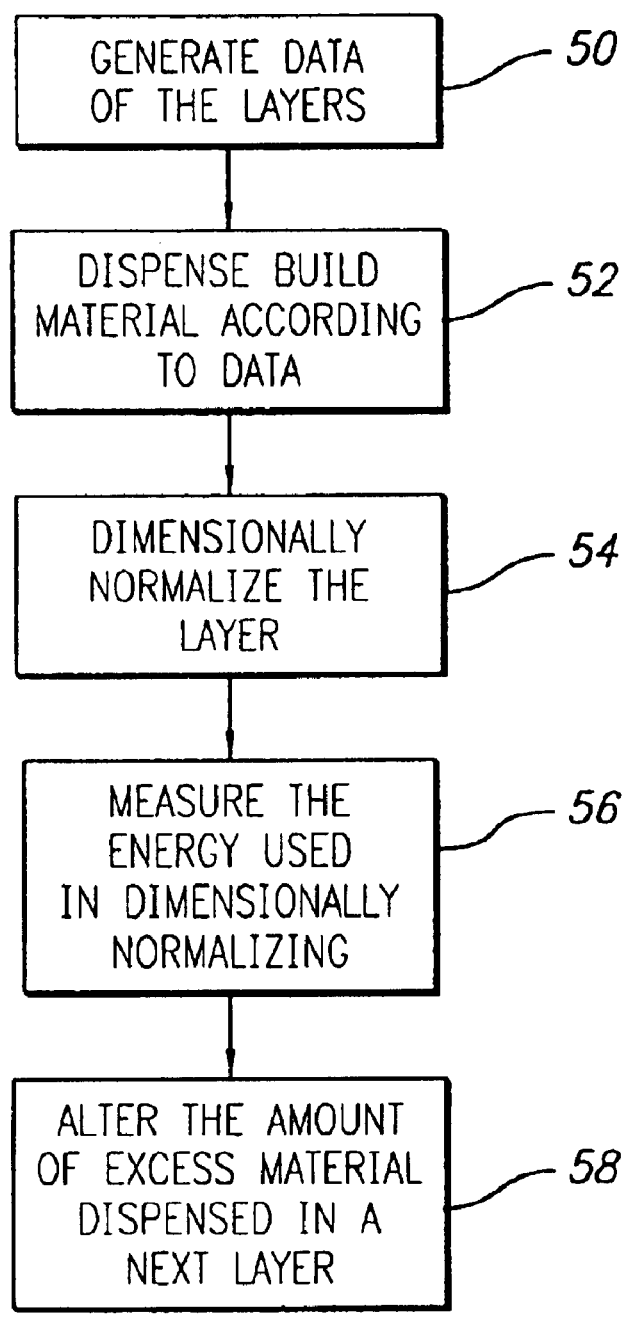
FIG. 5 is a flow chart depicting a closed loop method of the present invention.

Referring to FIG. 5, a flow chart shows the steps for practicing the present invention in an active or closed loop manner when three-dimensional objects are being formed. However, before practicing the present invention in a closed loop manner, the drop mass versus power plot data for the SDM apparatus discussed above with respect to FIGS. 3 and 4 must first be obtained and provided to the computer controller of the apparatus. The first step of practicing the invention in a closed loop manner, shown by numeral 50, is to generate data descriptive of the layers of a three-dimensional object. Typically an STL file of the object is provided which is then processed into slice data, as discussed previously. The data for each layer of the object includes a desired layer thickness, which may or may not be the same value for all layers of the object. The second step, shown by numeral 52, is to dispense the build material according to the layer data to form a layer of dispensed material. Preferably, the dispensed layer of material has a thickness greater than the desired thickness of the layer. The third step, shown by numeral 54, is to dimensionally normalize the layer to remove the excess amount of material and establish the desired thickness for the layer. Preferably, this is accomplished with the heated planarizer that is driven at a substantially constant angular velocity across the surface of the object, as discussed previously. The fourth step, shown by numeral 56, is to measure the amount of power utilized in dimensionally normalizing the layer. This is preferably accomplished by measuring the current being utilized by the motor as it rotably drives the planarizer at a constant angular velocity. It should be noted that steps three and four, shown respectively by numerals 54 and 56, occur at the same time.

The fifth step, shown by numeral 58, is to alter the amount of excess material dispensed in a next layer. In this step, the data of drop mass versus power is used to determine an optimum drop mass value (optimum firing voltage) for dispensing the next layer. With data supplied to the controller that is representative of the plot shown in FIG. 4, the controller is provided with the current measured during planarizing, and taking into account the surface area of the layer just formed, the amount of excess material to be removed on a next dispensed layer is determined. Preferably, the amount of excess material to be removed is adjusted by changing the firing voltage of the print head to optimally set the drop mass of the print head. Alternatively, the amount of excess material to be removed can be altered by adjusting the value of the desired layer thickness for each layer in order to minimize the amount of build material to be removed on subsequent layers. If the dispensing device is an ink jet print head, it is preferred to adjust the firing voltage supplied to the print head to optimally adjust the drop mass, thereby allowing the desired layer thickness for each layer to remain unchanged. Alternatively, the dispensing rate can be altered by increasing or decreasing the number of passes by the dispensing device when dispensing build material to form a layer, if desired, without adjusting the drop mass. This would, however, accordingly increase or decrease the build time in forming the object.

Although it is preferred that the present invention be used to calibrate an SDM system by building a test object at full envelope size, it can also be used to optimize an SDM system on the fly in a closed loop manner when building any desired part, as discussed in conjunction with FIG. 5. However, this would require substantial computer processing. For instance, the cross-sectional variations in the X and Y dimensions of the various layers must be taken into account when processing the measured current value to determine the appropriate adjustment needed to alter the amount of excess build material to be dispensed in the subsequent layers to an optimum level. This would add additional processing complexity to the apparatus, but would desirably provide a closed loop system for optimally forming layers without relying on active scanning systems utilizing video image sensors such as charged coupled device (CCD) cameras.

In a preferred embodiment the print head 24 dispenses a different phase change material to form support regions for the object. Further, multiple print heads could be used that are dedicated to dispensing either or both of the materials. Preferably, the support material is selected so as to be easily removed from the three-dimensional object at the end of the layerwise build process, yet have a similar melt and freeze point as the curable material so that dispensing and planarizing will be uniform. In this embodiment, separate material delivery systems would be required for the two materials, however, only one waste collection system would be needed wherein the waste may be a combination of both material collected after planarizing. Further, the present invention may be used to first calibrate the dispensing of the build material, and then used to calibrate the dispensing of the support material, if desired.

What has been described are preferred embodiments in which modifications and changes may be made without departing from the spirit and scope of the accompanying claims.

What is claimed is:

1. A method for forming a three-dimensional object by dispensing a build material in a layerwise manner, the method comprising:
    generating data descriptive of the layers of the object;
    dispensing the build material according to the data to form a layer of the three-dimensional object, the dispensed layer having a thickness greater than a desired layer thickness by an excess amount;
    dimensionally normalizing the layer to remove the excess amount of build material and thereby establish the desired layer thickness for the layer;
    measuring the power utilized in dimensionally normalizing the layer to obtain a measurement indicative of the amount of excess material removed.

2. The method of claim 1 further comprising:
    altering the excess amount of build material dispensed in a next layer in response to the measurement of the power utilized in dimensionally normalizing the layer.

3. The method of claim 2 wherein the step of altering the excess amount of build material dispensed in a next layer is accomplished by adjusting the dispensing rate of the build material.

4. The method of claim 3 wherein at least one print head is used to dispense the build material and the step of altering the excess amount of build material dispensed in a next layer is accomplished by adjusting a firing voltage supplied to the print head.

5. The method of claim 2 wherein the step of altering the excess amount of build material dispensed in a next layer is accomplished by changing the desired layer thickness for the next layer.

6. The method of claim 1 wherein the step of dimensionally normalizing the layer is achieved by passing a rotating planarizer over the layer to remove the excess build material.

7. The method of claim 6 wherein the planarizer is rotated at a constant angular velocity by a motor and wherein the step of measuring the power utilized in dimensionally normalizing the layer is accomplished by monitoring the current supplied to the motor.

8. The method of claim 7 wherein the surface of the planarizer is maintained at a temperature that does not deviate by more than about 5° C. when dimensionally normalizing the layers.

9. The method of claim 8 wherein an encoder is provided on the motor to monitor the angular velocity of the planarizer when dimensionally normalizing the layers.

10. A closed loop selective deposition modeling system for dispensing a build material to form a three-dimensional object in a layerwise fashion, the system comprising:
    means for generating data descriptive of the three-dimensional object;
    means for supporting the three-dimensional object as it is formed;
    means for dispensing the build material according to the data to form a layer of the three-dimensional object, the dispensed layer having a thickness greater than a desired layer thickness by an excess amount;
    means for dimensionally normalizing the layer to remove the excess amount of build material and thereby establish the desired layer thickness;
    means for measuring the power utilized in dimensionally normalizing the layer to obtain a measurement indicative of the amount of excess material removed.

11. The system of claim 10 further comprising:
    means for adjusting the excess amount of build material dispensed in a next layer in response to the measurement of the power utilized in dimensionally normalizing the layer.

12. The system of claim 11 wherein the means for adjusting the excess amount of build material in a next dispensed layer is accomplished by adjusting the means for dispensing the build material to dispense the build material at a different dispensing rate.

13. The system of claim 11 wherein the means for adjusting the excess amount of build material in a next dispensed layer is accomplished by adjusting the respective position between the means for supporting the three-dimensional object and the means for dimensionally normalizing the layer, thereby changing the desired layer thickness for the next dispensed layer.

14. A closed loop selective deposition modeling apparatus for forming a three-dimensional object by dispensing a build material in a layerwise manner, the apparatus comprising:

a platform for supporting the three-dimensional object as it is being formed;

a dispenser for dispensing the build material to form the layers of the three-dimensional object as it is being formed;

a planarizer for dimensionally normalizing the layers of the three-dimensional object by removing excess build material to establish a desired layer thickness, the planarizer being rotated at a substantially constant angular velocity utilizing a substantially constant power level when dimensionally normalizing the layers;

a means for measuring the substantially constant power level utilized by rotating the planarizer at a substantially constant angular velocity when dimensionally normalizing the layers;

a waste collection system for collecting the excess build material from the planarizer;

at least one controller in communication with the platform, dispenser, planarizer, and means for measuring the substantially constant power level, the controller for selectively dispensing the build material according to data descriptive of a layer for each layer of the three-dimensional object and for dimensionally normalizing the layers; and wherein the controller adjusts the amount of excess build material collected by the waste collection system in response to the measurement of the power taken by the means for measuring the substantially constant power level.

15. The apparatus of claim 14 wherein the controller adjusts the amount of excess build material collected by the waste collection system by adjusting the dispensing rate of build material from the dispenser.

16. The apparatus of claim 15 wherein the dispenser comprises at least one print head and the means for altering the amount of excess build material collected by the waste collection system is accomplished by the controller that adjusts a firing voltage supplied to the print head.

17. The apparatus of claim 15 wherein the controller adjusts the amount of excess build material collected by the waste collection system by adjusting the relative position between the platform and planarizer in the apparatus.

18. The apparatus of claim 15 further comprising a motor that rotates the planarizer at the constant velocity and the means for measuring the substantially constant power used to maintain the planarizer at the constant angular velocity comprises monitoring the current supplied to the motor.

19. The apparatus of claim 18 further comprising a heater system in communication with the planarizer and controller for maintaining the planarizer at a temperature that does not deviate by more than about 5° C. when dimensionally normalizing the layers.

20. The apparatus of claim 19 further comprising an encoder for monitoring the angular velocity of the planarizer, the encoder in communication with the controller, the controller adjusting the current supplied to the motor to maintain the angular velocity of the planarizer.

* * * * *